United States Patent
Wang

(10) Patent No.: US 9,922,011 B2
(45) Date of Patent: Mar. 20, 2018

(54) MASKING AN OBJECT IN HYPERTEXT MARKUP LANGUAGE

(71) Applicant: International Business Machines Corporation, Armonk, NY (US)

(72) Inventor: Zhe Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 14/849,844

(22) Filed: Sep. 10, 2015

(65) Prior Publication Data

US 2017/0075866 A1    Mar. 16, 2017

(51) Int. Cl.
*G06F 17/20* (2006.01)
*G06F 17/22* (2006.01)
*G06F 17/21* (2006.01)
*G06T 11/00* (2006.01)

(52) U.S. Cl.
CPC .......... *G06F 17/227* (2013.01); *G06F 17/218* (2013.01); *G06F 17/2247* (2013.01); *G06T 11/001* (2013.01)

(58) Field of Classification Search
CPC .. G06F 17/2247; G06F 17/248; G06F 17/218; G06F 17/227; G06F 17/2264; G06T 11/001
See application file for complete search history.

(56) References Cited

U.S. PATENT DOCUMENTS

| 6,771,816 | B1 | 8/2004 | Gaither |
| 2012/0173967 | A1 | 7/2012 | Lillesveen |
| 2013/0246909 | A1 | 9/2013 | Carroll |
| 2013/0311877 | A1* | 11/2013 | Ebner ................. G06F 17/2247 715/236 |
| 2015/0082150 | A1* | 3/2015 | Buonomo ............ G06F 17/227 715/236 |

FOREIGN PATENT DOCUMENTS

| CN | 103425466 A | 12/2013 |
| WO | 0180088 A2 | 10/2001 |

OTHER PUBLICATIONS

Wang, Z. "Masking an Object in Hypertext Markup Language," U.S. Appl. No. 15/291,258, filed Oct. 12, 2016.
List of IBM Patents or Patent Applications Treated as Related, Oct. 10, 2016, 2 pgs.
Mesbah et al., "Automated Analysis of CSS Rules to Support Style Maintenance," 34th International Conference on Software Engineering (ICSE), 2012, pp. 408-418, Zurich, Switzerland, © 2012 IEEE DOI: 10.1109/ICSE.2012.6227174.

* cited by examiner

*Primary Examiner* — Shahid Khan
(74) *Attorney, Agent, or Firm* — Robert J. Shatto

(57) ABSTRACT

A computer system may identify a first and second predefined color that are found in a Cascading Style Sheets (CSS) style sheet for a webpage. The computer system may receive an object to be embedded in the webpage. The computer system may calculate a color similarity score for each of the predefined colors. The computer system may compare the color similarity scores for the predefined color and determine, based on the comparison, which predefined color is the mask color. The computer system may then mask the object using the mask color.

20 Claims, 4 Drawing Sheets

| Predefined Color | Distance |
|---|---|
| PC1 | 101 shades |
| PC2 | 115 shades |
| PC3 | 195 shades |
| PC4 | 132 shades |
| PC5 | 132 shades |

MASKING AN OBJECT IN HYPERTEXT MARKUP LANGUAGE

BACKGROUND

The present disclosure relates generally to the field of computing, and more particularly to masking an object's color in hypertext markup language (HTML).

Cascading Style Sheets (CSS) is a style sheet language that uses class lists to establish style rules affecting the look and formatting of a document in a markup language, such as HTML. For example, a CSS class list may establish the font type (e.g., Times New Roman), size, and/or color, among other things, for all object within the class. A webpage may utilize multiple class lists, each with its own style. For example, within a single webpage, there may be 5 class lists, each defining a different color for objects within 5 different classes. When a web developer wants to add a new object (such as a table) to the webpage, he may apply one of the predefined class lists to the object, or he may generate a new class list for the object.

SUMMARY

Embodiments of the present invention disclose a method, computer program product, and system for masking an object's color in hypertext markup language (HTML). A computer system may identify a first and second predefined color that are found in a Cascading Style Sheets (CSS) style sheet for a webpage. The computer system may receive an object to be embedded in the webpage. The object may have an object color. The computer system may calculate a color similarity score for each of the predefined colors. The color similarity scores may indicate how similar the predefined colors are to the object color. The computer system may compare the color similarity scores for the predefined color and determine, based on the comparison, which predefined color is the mask color. The mask color may be the predefined color that is most similar to the object color. The computer system may then mask the object using the mask color.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figures 1A, 1B:
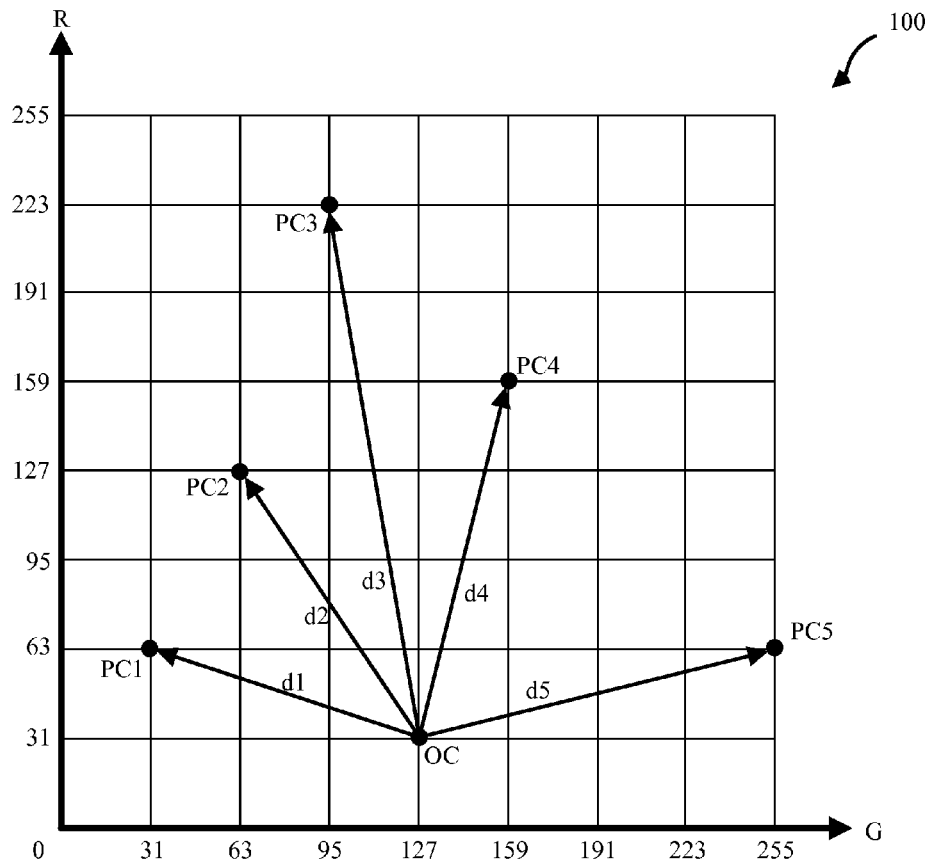
FIG. 1A illustrates an exemplary plot of an object color and five predefined colors, in accordance with embodiments of the present disclosure.
FIG. 1B illustrates a table of the color distances for the predefined colors of FIG. 1A, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to masking an object's color in hypertext markup language (HTML). While the present disclosure is not necessarily limited to such applications, various aspects of the disclosure may be appreciated through a discussion of various examples using this context.

As a web developer adds objects (e.g., tables, text, charts, etc.) to a document (e.g., a webpage or other hypertext page or electronic document), he may wish to limit the number of edits made to a Cascading Style Sheets (CSS) style sheet for the webpage. This may be done because, e.g., large CSS style sheets often cause webpages to load slowly because the entire style sheet may be loaded before the webpage can be rendered by the web browser. It may be particularly advantageous to limit the size of the CSS style sheet when the webpage is part of a large website that shares the same style sheet across many webpages because any edit done to the CSS style sheet in support of the particular webpage will affect the performance of all webpages that call on the CSS style sheet. In addition to take longer to load, larger CSS style sheets require additional data be transmitted across a network. This may be particularly important for users who access the internet with tablets and smartphones, which often require data plans that are paid for based on the amount of data consumed.

The web developer may also wish to limit the number of colors defined in the CSS style sheet for aesthetic purposes. A web developer may prefer to use a relatively small number of colors on a given page to provide a clean presentation to users. For example, the web developer may believe that a website with numerous shades of the same color, particularly in adjacent objects, looks cluttered or otherwise unacceptable. If two adjacent objects use similar shades of red, a user may be distracted by the subtle, but noticeable, differences between the two objects.

With the adoption of HTML 5, the color of an object rendered in a webpage is determined using CSS class lists, instead of using HTML tags such as the now unsupported "bgcolor" tag. When a web developer receives an object to be added to a webpage, the object may have an associated color (referred to herein as the "object color"). If the object color is found in a particular CSS class list (associated with a particular class), the web developer may assign the object to the particular class. If, however, the object color is not found in a class list, the web developer may have to choose between adding a new class list to the CSS style sheet and changing the color of the object.

In order to limit the size of, and/or the number of colors in, the CSS style sheet (for performance, aesthetic, or other reasons), and to prevent a web developer from having to compare object color to a potentially large number of other colors by eye, a computer system may analyze the object color and the colors already defined in a CSS class list (herein referred to as "predefined colors"). The computer system may then determine whether the object color is in a class list by comparing the object color to the predefined colors. If the object color matches a predefined color, the computer system may automatically assign the object to the class that uses the predefined color. If, however, the object color does not match any of the predefined colors, the computer system may determine which predefined color most closely resembles the object color according to a predefined criteria. The most similar predefined color is referred to herein as the "mask color." After determining which predefined color is the mask color, the computer system may mask the object by assigning it to the class containing the mask color.

In some embodiments, the computer system may determine which predefined color is the mask color by generating, for each predefined color, a color similarity score. The color similarity score may be a numeric score related to a level of similarity between the predefined color and the object color. In some embodiments, the computer system may decompose each predefined color and the object color into their red, green, and blue constituent color components (for systems that use an RGB color space). The computer system may then calculate a color distance between the object color and each predefined color. In some embodiments, the color similarity score for each predefined color may be equivalent to its color distance. The computer system may then determine that the predefined color with the smallest color similarity score (and, therefore, smallest color difference) is the mask color.

In some embodiments, calculating the color similarity score may comprise weighting each constituent color component. For example, differences in the red color component may be weighted more heavily than differences in the green color component. Accordingly, a predefined color with a 10 shade difference between it and the object color in the red component (and no difference in the green and blue components) may be considered to be less similar than a predefined color with a 10 shade difference in the green component (and no difference in the red and blue components).

Referring now to the figures, FIG. 1A illustrates an exemplary plot 100 of an object color OC and five predefined colors PC1-PC5, in accordance with embodiments of the present disclosure. The plot 100 illustrates the value of the red (y-axis) and green (x-axis) constituent color components for the object color OC and the five predefined colors PC1-PC5. The plot 100 may be used to determine which predefined color PC1-PC5 should be used to mask an HTML object. The plot 100 and table 101 (shown in FIG. 1B) are shown for illustrative purposes only, and they need not actually be generated by the computer system in order to perform the various methods disclosed herein.

For each predefined color PC1-PC5, there is an associated color distance d1-d5, respectively, corresponding to the distance between the predefined color and the object color OC. For example, the first predefined color PC1 has a first color distance d1 to the object color OC, the second predefined color PC2 has a second color distance d2 to the object color, and so on. A computer system may use the color distance to create a similarity score for each of the predefined colors PC1-PC5 to determine which color should be used to mask the object. For colors with two constituent components (e.g., red and green components) like those shown in the plot 100, the computer system may calculate the color distance using the equation:

$$d = \sqrt{(Goc - Gpc)^2 + (Roc - Rpc)^2}$$

where d is the color distance, Goc is the value of the green component for the object color, Gpc is the value of the green component for the predefined color, Roc is the value of the red component for the object color, and Rpc is the value of the red component for the predefined color. Using the above equation, the values of the color distances d1-d5 for each predefined color may be determined to be roughly 101 shades for d1, 115 shades for d2, 195 shades for d3, 132 shades for d4, and 132 shades for d5, as shown in the table 101 in FIG. 1B.

While the plot 100 only illustrates a red and green component, a person of ordinary skill will recognize that additional (or different) constituent colors may be included. For example, the predefined colors PC1-PC5 and the object color OC may be generated in the standard RGB (sRGB) color space commonly used in computer monitors and TVs. Accordingly, each color may include a third constituent color component not shown in the plot 100 that corresponds to the level (shade) of blue found in the color. The equation for calculating a color distance with a third constituent color component, in this case by adding a blue component, may be:

$$d = \sqrt{(Goc - Gpc)^2 + (Roc - Rpc)^2 + (Boc - Bpc)^2}$$

where d is the color distance, Goc is the value of the green component for the object color, Gpc is the value of the green component for the predefined color, Roc is the value of the red component for the object color, Rpc is the value of the red component for the predefined color, Boc is the value of the blue component for the object color, and Bpc is the value of the blue component for the predefined color.

Other color spaces may add additional constituent colors to the commonly used red, green, and blue. For example, the RGBY color model adds a yellow constituent color component to the red, green, and blue constituent color components. Any other color space that is otherwise consistent with this disclosure is contemplated. Additional exemplary color spaces that may be used in aspects of the present disclosure include, but are not limited to, YIQ, YDbDr, YPbPr, YUV, YCbCr, xvYCC, HSV, and HSL color spaces. In some embodiments, an object with a color using a different color space (e.g., a YUV color space) may be converted into the RGB color space. After the object is masked, the new object color (e.g., the mask color) may be converted back into its original color space.

In addition to the constituent color components, each color (e.g., the object color OC and the five predefined colors PC1-PC5) may also have a transparency component, sometimes referred to as an alpha component. The computer system may, in some embodiments, consider the alpha components for the object color OC and predefined colors PC1-PC5 when calculating the color distances d1-d5. In other embodiments, the computer system may ignore the alpha component for the colors and instead only use the constituent color components when calculating the color distance. In these embodiments, the alpha component may still be used when generating a color similarity score for the predefined colors PC1-PC5 if the color similarity score considers more than just the color distance. In some embodiments, the alpha component may be altogether ignored when calculating a color similarity score for the predefined colors PC1-PC5.

Furthermore, while the plot 100 is shown with axes ranging from 0 to 255, indicating a color depth of 8 bits per channel (also known as bits per color), which is representative of images displayed in "true color," other color depths are possible and contemplated by this disclosure. For example, each constituent color component may be represented in "deep color" using 10 bits, allowing for 1024 different shades of each constituent color instead of the 256 different shades in 8 bits per channel color models. Other common color depths include, but are not limited to, 12 bit per channel and 16 bits per channel.

Figure 2:
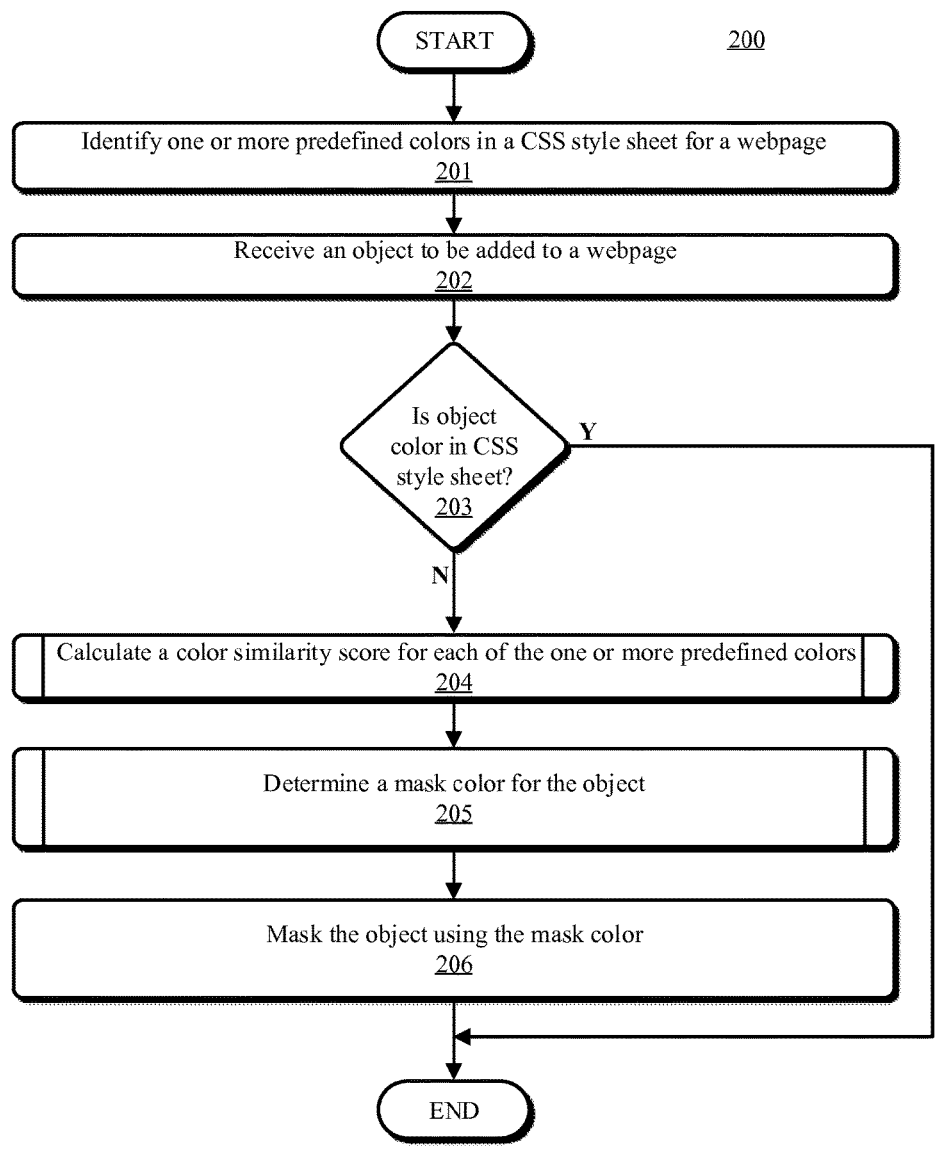
FIG. 2 is a flowchart illustrating a method for masking an object in hypertext markup language (HTML), in accordance with embodiments of the present disclosure.

Referring now to FIG. 2, shown is a flowchart illustrating a method 200 for masking an object in hypertext markup language (HTML), in accordance with embodiments of the present disclosure. The method 200 may be performed by a computer system, such as a server that hosts a webpage. In some embodiments, the method 200 may be performed by a web browser, or text editing program used to edit HTML, running on a computer system. The method 200 may begin at operation 201, where the computer system may identify one or more predefined colors in a CSS style sheet for a webpage.

In some embodiments, the one or more predefined color may be found in one or more CSS class lists defined in the CSS style sheet. CSS class lists may be used to establish style rules affecting the look and formatting of a document in a markup language. For example, a CSS class list may establish the font type (e.g., Times New Roman), size, and/or color, among other things, for all object within the class. A webpage may utilize multiple classes, each with its own class list dictating its own style. For example, within a single webpage, there may be 5 classes, and therefore 5 corresponding class lists, each defining a different color for objects within 5 different classes. When a web developer wants to add a new object (such as a table) to the webpage, he may assign the object to one of the predefined classes, or he may generate a new class for the object.

The computer system may identify all CSS classes within the webpage, whether they been found in inline CSS, an internal CSS style sheet, or in an external CSS style sheet. After identifying all of the classes, the computer system may check each class for a predefined color associated with the class. From this, the computer may generate a list of all of the predefined colors in the CSS style sheet.

After identifying the one or more predefined colors in a CSS style sheet at operation 201, the computer system may receive an object to be added to a webpage using the CSS style sheet at operation 202. The object may be any web object that is going to be embedded into the webpage such as, e.g., a table or a text box. The object may have an associated object color. For example, if the object is a text box, the object may have a font color and/or a background color. As another example, if the object is a table, the object may have a font color, a color for the table borders, or a background color for the table cells. In some embodiments, the object may have more than one color (e.g., a table may have both a font color and a background color). In these embodiments, the method 200 (particularly operations 203-206) may be performed for each object color.

After receiving the object to be added to the webpage at operation 202, the computer system may determine whether the object color is in the CSS style sheet at decision block 203. The computer system may compare the object color to each of the predefined colors to see if there is a match. If the object color is found in the CSS style sheet, the object may be assigned to the matching CSS class and embedded into the webpage and the method 200 may end. If the object color is not found in the CSS style sheet (or in the generated list of predefined colors), the computer system may calculate a color similarity score for each predefined color at operation 204.

The color similarity score may be a numeric score related to a level of similarity between the predefined color and the object color. In some embodiments, the computer system may decompose each predefined color and the object color into their red, green, and blue constituent color components (for systems that use an RGB color space). The computer system may then calculate a color distance between the object color and each predefined color. In some embodiments, the color similarity score for each predefined color may be equivalent to its color distance, in which case the smaller the color similarity score, the greater the similarity. The computer system may then determine that the predefined color with the smallest color similarity score (and, therefore, smallest color difference) is the mask color.

In some embodiments, calculating the color similarity score may comprise weighting each constituent color component. For example, differences in the red color component may be weighted more heavily than differences in the green color component. Accordingly, a predefined color with a 10 shade difference between it and the object color in the red component (and no difference in the green and blue components) may be considered to be less similar than a predefined color with a 10 shade difference in the green component (and no difference in the red and blue components).

In some embodiments, the color similarity score may relate to the relative shades of the constituent color components. The similarity score may be based on, at least in part, the ratio of the constituent color components. Accordingly, two predefined colors with the same color distance to the object color may nevertheless have different color similarity scores. For example, the object color may have a red shade (e.g., value of red constituent color component) to blue shade (e.g., value of blue constituent color component) ratio of 2 to 1 (e.g., there is twice as much red as there is blue in the object color). The green shade to blue shade ratio may be 1 to 1 for the object color, meaning that the red to green to blue ratio may be 2:1:1. A first predefined color may have a color distance of 100 shades and a red to green to blue ratio of 2.5:1.5:1. A second predefined color may also have a color distance of 100 shades, but it may have a red to green to blue ratio of 2:1:1, just like the object color. Accordingly, the color similarity score for the second predefined color might differ from the color similarity score for the first predefined color, and the similarity score for the second predefined color might indicate that it more closely matches the object color.

In some embodiments, the color similarity score may not include the color distance at all. Instead, the score may be determined using other metrics, alone or in combination with each other. For example, in some embodiments the color similarity score may be based solely on the ratio of the constituent color components. The methods for calculating a color similarity score discussed herein are used for illustrative purposes only. Any other method or process for determining the similarity between colors that is otherwise consistent with the present disclosure is contemplated.

After determining a similarity score for each predefined color at operation 204, the computer system may determine a mask color for the object at operation 205. The computer system may compare the color similarity scores for each of the predefined color and choose the predefined color that is most similar to the object color as the mask color. In some embodiments, the lower the color similarity score, the more similar the predefined color and the object color are. For example, when the color distance is used as the similarity score, the lower the number the more similar the colors. In these embodiments, the computer system may select the predefined color with the lowest color similarity score as the mask color. In some embodiments, where the higher the color similarity score the more similar the colors, the computer system may choose the predefined color with the highest color similarity score as the mask color.

After determining the mask color at operation 205, the computer system may mask the object at operation 206. The computer system may automatically modify the HTML code for the webpage (specifically, the HTML code associated with the object) to assign the object to the class that uses the mask color. After the computer system masks the object with the mask color, the method 200 may end.

Figure 3:
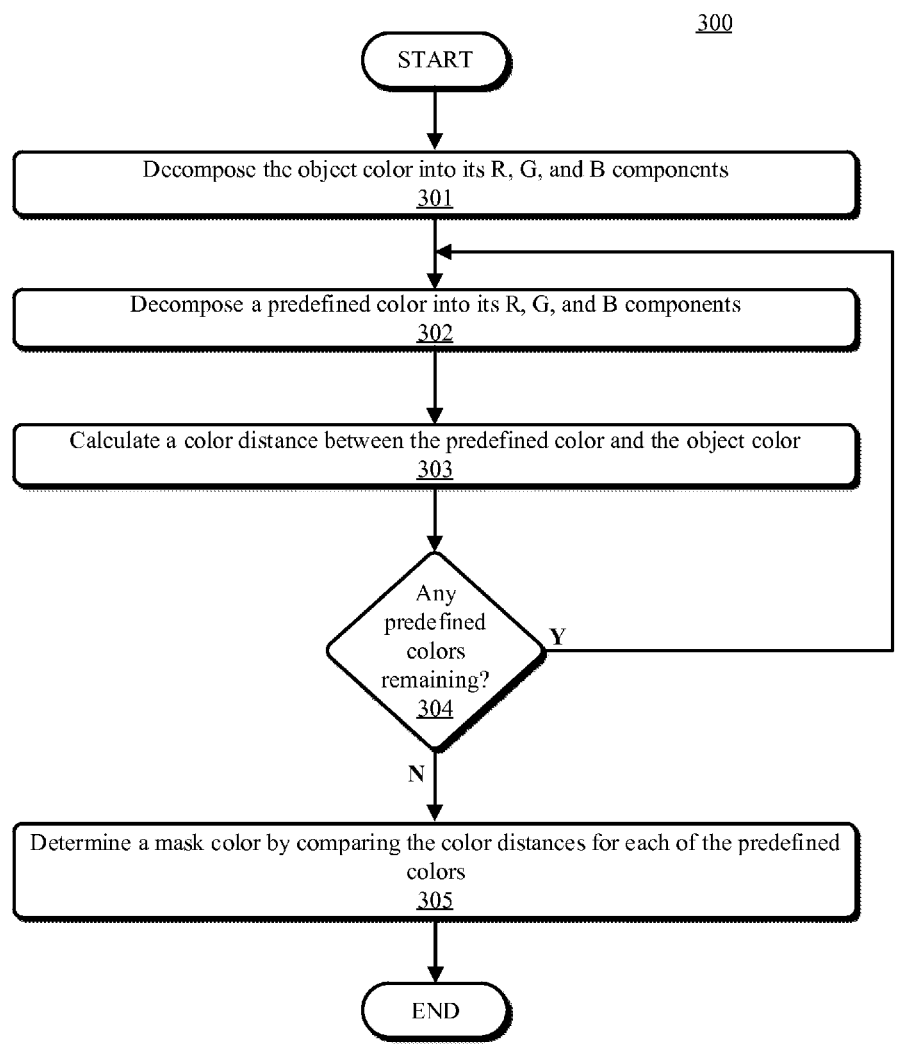
FIG. 3 is a flowchart illustrating a method for determining a color similarity score and mask color, in accordance with embodiments of the present disclosure.

Referring now to FIG. 3, shown is a flowchart illustrating a method 300 for determining a color similarity score and mask color, in accordance with embodiments of the present disclosure. The method 300 may be performed by a computer system, such as a server that hosts a webpage. In some embodiments, the method 300 may be performed by a web browser, or text editing program used to edit HTML, running on a computer system. The method 300 may begin at operation 301, where the computer system may decompose (or convert) the object color into its red, green, and blue constituent color components.

The computer system may decompose the object color by parsing the code for the object. For example, in some embodiments an object color may be identified by parsing an HTML tag or attribute (for HTML 4) or CSS style tag or attribute (for HTML 4 and HTML 5) related to the object color. The computer system may use a specialized dictionary or other method to recognize HTML and CSS tags associated with establishing color in order to parse the code to identify the object color. In some embodiments, the computer system may use natural language processing techniques to identify the object color. The object color may be identified as a hexadecimal value (e.g., "#FF00FF" for a shade of purple) attached to a specific attribute (e.g., the "bgcolor" tag for background color in HTML 4).

The hexadecimal value can be decomposed into constituent red, green, and blue values. The first two numbers or letters following the hash character (#), also known as the number sign, represent the hexadecimal value for the shade of the red component. The following two numbers or letters represent the hexadecimal value for the shade of the green component, and the final two numbers or letters represent the hexadecimal value for the shade of the blue component.

After decomposing (or converting) the object color at operation 301, the computer system may decompose a predefined color into its red, green, and blue constituent color components at operation 302. The computer system may decompose the predefined color using the same method that was described in reference to operation 301. After decomposing the predefined color at operation 302, the computer system may calculate a color distance between the predefined color and the object color at operation 303. The computer system may calculate the color distance as described in reference to FIGS. 1A and 1B.

After calculating a color distance between the predefined color and the object color at operation 303, the computer system may determine whether there are any predefined colors that have not yet been scored (e.g., do not have a color distance calculated) at decision block 304. If there is an unscored predefined color remaining, the method 300 may return to operation 302. If no predefined color remains, the computer system may determine a mask color for the object at operation 305.

The computer system may compare the color distances for each predefined color to determine the mask color. The lower the value of the color distance, the more similar the colors. Accordingly, the computer system may select the predefined color with the lowest color distance as the mask color. After determining a mask color at operation 305, the method 300 may end.

Figure 4:
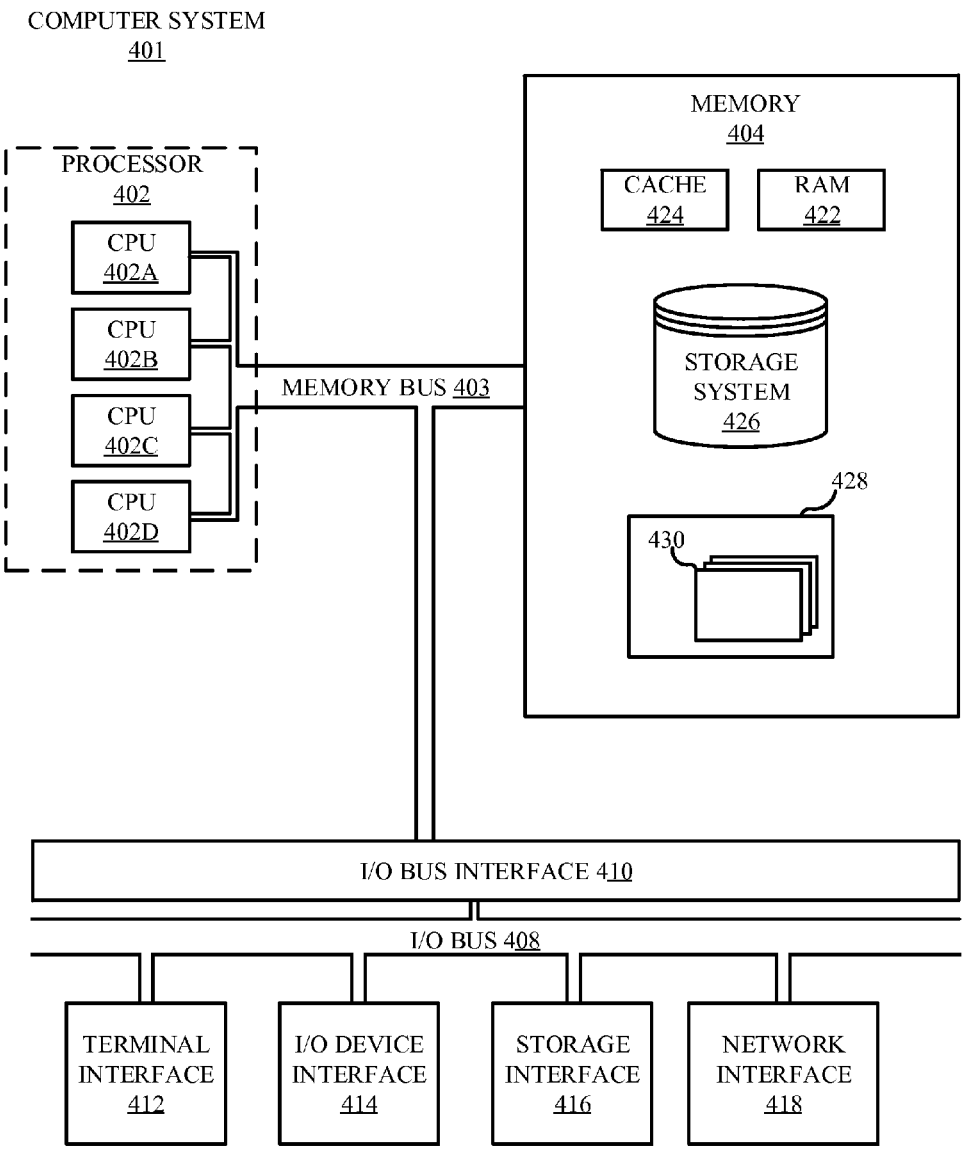
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system (e.g. a web server) 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 430 generally perform the functions or methodologies of various embodiments.

For example, in an embodiment of the present disclosure, the program modules 430 may include an object receiving module, a color decomposition module, a similarity score generator, and a color masking module. The object receiving module may include instructions to receive, at the computer system 401, an object that is to be embedded into a webpage or other markup language document (e.g., perform operation 202 as discussed in reference to FIG. 2). The color decomposition module may include instructions to decompose the object color into its red, green, and blue constituent color components (e.g., perform operation 301). The color decomposition module may also include instructions to determine, from a CSS style sheet, a list of predefined color (e.g., perform operation 201). The color decomposition module may further include instructions to decompose each of the predefined colors into their respective red, green, and blue constituent color components (e.g., perform operation 302).

The similarity score generator may include instructions to generate, for each predefined color, a color similarity score that identifies how similar the predefined color is to the object color (e.g., perform operation 204). The similarity score generator may also include instructions to determine, based on the color similarity scores for the predefined color, which predefined color is most similar to the object color (e.g., which predefined color is the mask color as discussed in reference to operation 205 of FIG. 2 and/or operation 305 of FIG. 3). The color masking module may include instructions to edit the HTML code associated with the received object to embed the object in the webpage and to mask the object with the mask color by, e.g., assigning the object to a CSS class that uses the mask color (e.g., perform operation 206).

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system for masking objects using predefined colors, the system comprising:
   a memory;
   a processor circuit in communication with the memory, wherein the processor circuit is configured to perform a method comprising:

identifying a first predefined color and a second predefined color, the first and second predefined colors being included in a Cascading Style Sheets (CSS) style sheet used by a webpage, the CSS style sheet having a predetermined set of classes for the webpage, each class having an associated predefined color;

receiving an object to be added to the webpage, the object having an object color;

calculating, by a processor, a first color similarity score for the first predefined color and a second color similarity score for the second predefined color, the color similarity scores indicating a level of similarity between the predefined colors and the object color;

comparing the first color similarity score to the second color similarity score;

determining, based on the comparing, a mask color, the mask color being the predefined color that is most similar to the object color; and masking the object using the mask color, wherein the masking includes changing a color of the object to the mask color.

2. The system of claim 1, wherein the first predefined color is in a first class list associated with a first class in the CSS style sheet and the second predefined color is in a second class list associated with a second class in the CSS style sheet.

3. The system of claim 1, the method performed by the processor circuit further comprising identifying the object color by parsing hypertext markup language (HTML) code associated with the object.

4. The system of claim 1, wherein the calculating the first color similarity score and the second color similarity score comprises:

converting the object color from a first color space into a RGB color space;

converting the first predefined color into a RGB format;

converting the second predefined color into a RGB format;

determining a first color distance for the first predefined color;

determining a second color distance for the second predefined color; and calculating the first color similarity score based on the first color distance and the second color similarity score based on the second color distance.

5. The system of claim 4, wherein the converting the first and second predefined colors into a RGB format comprises decomposing the first and second predefined colors into their red, green, and blue constituent color components.

6. The system of claim 1, wherein the calculating the color similarity score comprises:

decomposing the object color and the first and second predefined colors into their red, green, and blue constituent color components;

determining an object color ratio, the object color ratio being the numeric ratio of the values of the red, green, and blue constituent color components for the object color;

determining a first predefined color ratio, the first predefined color ratio being the numeric ratio of the values of the red, green, and blue constituent color components for the first predefined color;

determining a second predefined color ratio, the second predefined color ratio being the numeric ratio of the values of the red, green, and blue constituent color components for the second predefined color; and calculating, for the first and second predefined colors, the color similarity score, wherein the color similarity score is based on the predefined color ratios.

7. The system of claim 1, wherein the masking the object using the mask color comprises assigning the object to a class in the CSS style sheet, the class including the mask color.

8. A computer program product comprising a computer readable storage medium having program instructions embodied therewith, the program instructions executable by a computer to cause the computer to perform a method comprising:

identifying a first predefined color and a second predefined color, the first and second predefined colors being included in a Cascading Style Sheets (CSS) style sheet used by a webpage, the CSS style sheet having a predetermined set of classes for the webpage, each class having an associated predefined color;

receiving an object to be added to the webpage, the object having an object color;

calculating, by a processor, a first color similarity score for the first predefined color and a second color similarity score for the second predefined color, the color similarity scores indicating a level of similarity between the predefined colors and the object color;

comparing the first color similarity score to the second color similarity score;

determining, based on the comparing, a mask color, the mask color being the predefined color that is most similar to the object color; and masking the object using the mask color, wherein the masking includes changing a color of the object to the mask color.

9. The computer program product of claim 8, wherein the first predefined color is in a first class list associated with a first class in the CSS style sheet and the second predefined color is in a second class list associated with a second class in the CSS style sheet.

10. The computer program product of claim 8, wherein the calculating the first color similarity score and the second color similarity score comprises:

converting the object color from a first color space into a RGB color space;

converting the first predefined color into a RGB format;

converting the second predefined color into a RGB format;

determining a first color distance for the first predefined color;

determining a second color distance for the second predefined color; and calculating the first color similarity score based on the first color distance and the second color similarity score based on the second color distance.

11. The computer program product of claim 8, wherein the calculating the color similarity score comprises:

decomposing the object color and the first and second predefined colors into their red, green, and blue constituent color components;

determining an object color ratio, the object color ratio being the numeric ratio of the values of the red, green, and blue constituent color components for the object color;

determining a first predefined color ratio, the first predefined color ratio being the numeric ratio of the values of the red, green, and blue constituent color components for the first predefined color;

determining a second predefined color ratio, the second predefined color ratio being the numeric ratio of the values of the red, green, and blue constituent color components for the second predefined color; and calculating, for the first and second predefined colors, the color similarity score, wherein the color similarity score is based on the predefined color ratios.

12. The computer program product of claim 8, wherein the masking the object using the mask color comprises assigning the object to a class in the CSS style sheet, the class including the mask color.

13. The computer program product of claim 10, wherein the first color space is selected from the group consisting of a YIQ color space, a YDbDr color space, a YPbPr color space, and a YUV color space.

14. The computer program product of claim 8, wherein the determining the mask color comprises:
    determining, based on the first color similarity score and the second color similarity score, that the object color is more similar to the first predefined color than to the second predefined color; and
    assigning the first predefined color as the mask color.

15. The computer program product of claim 14, wherein the masking the object using the mask color comprises:
    determining that a first class of the predetermined set of classes in the CSS style sheet is associated with the first predefined color;
    assigning the object to the first class in source code for the webpage; and
    embedding the masked object into the webpage.

16. The computer program product of claim 8, wherein the determining the mask color comprises:
    determining an object color ratio, the object color ratio being the ratio of the red, green, and blue constituent color components for the object color;
    determining a first predefined color ratio, the first predefined color ratio being the ratio of the red, green, and blue constituent color components for the first predefined color;
    determining a second predefined color ratio, the second predefined color ratio being the ratio of the red, green, and blue constituent color components for the second predefined color;
    determining that the first color distance and the second color distance are equal;
    comparing the object color ratio to the first predefined color ration and to the second predefined color ratio;
    determining that the object color ratio does not match the first predefined color ratio;
    determining that the object color ratio matches the second predefined color ratio; and
    selecting the second predefined color as the mask color.

17. The system of claim 4, wherein the first color space is selected from the group consisting of a YCbCr color space, a xvYCC color space, a HSV color space, and a HSL color space.

18. The system of claim 1, wherein the determining the mask color comprises:
    determining, based on the first color similarity score and the second color similarity score, that the object color is more similar to the first predefined color than to the second predefined color; and
    assigning the first predefined color as the mask color.

19. The system of claim 18, wherein the masking the object using the mask color comprises:
    determining that a first class of the predetermined set of classes in the CSS style sheet is associated with the first predefined color;
    assigning the object to the first class in source code for the webpage; and
    embedding the masked object into the webpage.

20. The system of claim 1, wherein the determining the mask color comprises:
    determining an object color ratio, the object color ratio being the ratio of the red, green, and blue constituent color components for the object color;
    determining a first predefined color ratio, the first predefined color ratio being the ratio of the red, green, and blue constituent color components for the first predefined color;
    determining a second predefined color ratio, the second predefined color ratio being the ratio of the red, green, and blue constituent color components for the second predefined color;
    determining that the first color distance and the second color distance are equal;
    comparing the object color ratio to the first predefined color ration and to the second predefined color ratio;
    determining that the object color ratio does not match the first predefined color ratio;
    determining that the object color ratio matches the second predefined color ratio; and
    selecting the second predefined color as the mask color.

* * * * *